US008769175B2

(12) United States Patent  
Liu

(10) Patent No.: US 8,769,175 B2  
(45) Date of Patent: Jul. 1, 2014

(54) ADJUSTMENT OF POST AND NON-POST PACKET TRANSMISSIONS IN A COMMUNICATION INTERCONNECT

(75) Inventor: Lei Liu, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 267 days.

(21) Appl. No.: 13/044,182

(22) Filed: Mar. 9, 2011

(65) Prior Publication Data

US 2012/0233375 A1    Sep. 13, 2012

(51) Int. Cl.  
*G06F 13/36* (2006.01)

(52) U.S. Cl.  
USPC ........................................... 710/116; 710/112

(58) Field of Classification Search  
USPC ......... 710/316–317, 305–306, 200, 240–244, 710/112, 116; 711/118; 370/235  
See application file for complete search history.

(56) References Cited

U.S. PATENT DOCUMENTS

| | | | |
|---|---|---|---|
| 6,614,756 B1 * | 9/2003 | Morgenstern et al. | 370/230 |
| 6,654,837 B1 * | 11/2003 | Hill et al. | 710/200 |
| 7,698,478 B2 * | 4/2010 | Wang et al. | 710/29 |
| 2004/0208126 A1 * | 10/2004 | Wassew et al. | 370/235 |
| 2006/0230215 A1 | 10/2006 | Woodral | 710/310 |
| 2008/0301256 A1 | 12/2008 | McWilliams et al. | 709/214 |
| 2009/0103556 A1 | 4/2009 | Naven et al. | 370/413 |
| 2009/0157919 A1 | 6/2009 | Dodson et al. | 710/57 |
| 2011/0087915 A1 * | 4/2011 | Zhang et al. | 714/2 |

FOREIGN PATENT DOCUMENTS

| | | | |
|---|---|---|---|
| JP | 2006302250 | 11/2006 | G06F 13/14 |
| JP | 2010128696 | 6/2010 | G06F 13/36 |

OTHER PUBLICATIONS

David Mayhew, et al., "PCI Express and Advanced Switching: Evolutionary Path to Building Next Generation Interconnects", IEEE 2003.

* cited by examiner

*Primary Examiner* — Faisal M Zaman  
*Assistant Examiner* — Kim Huynh  
(74) *Attorney, Agent, or Firm* — John H. Holcombe

(57) ABSTRACT

In a communication interconnect such as PCIe which favors post transmissions such as write requests over non-post transmissions such as read requests and completions, methods and systems for shortening the delay for non-post transmissions while maintaining fairness among the post transmissions. Undispatched non-post transmission requests are monitored on a running basis; and when a running value of the undispatched non-post transmission requests exceeds a threshold; ones of the post transmission requests are randomly dropped.

20 Claims, 3 Drawing Sheets

ADJUSTMENT OF POST AND NON-POST PACKET TRANSMISSIONS IN A COMMUNICATION INTERCONNECT

FIELD OF THE INVENTION

This invention relates to communication interconnects, for example, employed in computer systems, and more particularly to conducting packet transmissions with respect to communication interconnects.

BACKGROUND OF THE INVENTION

A popular type of communication interconnect, such as employed in computer systems, is the peripheral component interconnect (PCI). The PCI acts like a bridge, which isolates a host processor from the peripherals, allowing the host to run faster. A successor comprises the PCI Express (PCIe) which provides higher performance while maintaining compatibility with existing PCI arrangements. PCI Express protocol is more complex, with three layers—the transaction, data link and physical layers serving as a switch function. The PCIe switch needs to follow certain ordering rules set by specifications. As a result, the PCIe favors post transmissions over non-post transmissions in that all read or other non-post transmission requests or completions, with some exceptions, wait for the write or post transmission requests to be completed and flushed out.

SUMMARY OF THE INVENTION

Methods and communication interconnects provide communication for post and non-post transactions.

In one embodiment of a communication interconnect comprising a plurality of ports and processing components arranged to conduct packet transmissions, wherein the communication interconnect favors post transmissions over non-post transmissions, the processing components additionally arranged to:

monitor undispatched non-post transmission requests on a running basis;

determine when a running value of the undispatched non-post transmission requests exceeds a threshold; and in response to the threshold being exceeded, randomly drop ones of the post transmissions.

In a further embodiment, the communication interconnect processing components are additionally arranged to monitor the undispatched non-post transmission requests separately for each port of a plurality of the ports of the communication interconnect; wherein the threshold comprises a threshold for each port; and randomly drop ones of the post transmissions for a port in response to the threshold for the port being exceeded.

In another embodiment, the communication interconnect processing components are additionally arranged to monitor the non-post transmission requests for a plurality of ports of the communication interconnect; wherein the threshold comprises a threshold combining the monitored requests for the plurality of ports; and randomly drop ones of the post transmissions for the plurality of ports.

In still another embodiment, the random drop comprises an adjustable proportion of the post transmission requests that are randomly dropped.

In a further embodiment, the random drop comprises a maximum level in which all the post transmission requests are dropped.

In another embodiment, the random drop adjustable proportion comprises a linear slope.

In still another embodiment, the random drop comprises an adjustable point within a range of random numbers assigned to the post transmission requests, the requests having random numbers on one side of the adjustable point being dropped and the requests having random numbers on the other side of the adjustable point being processed.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
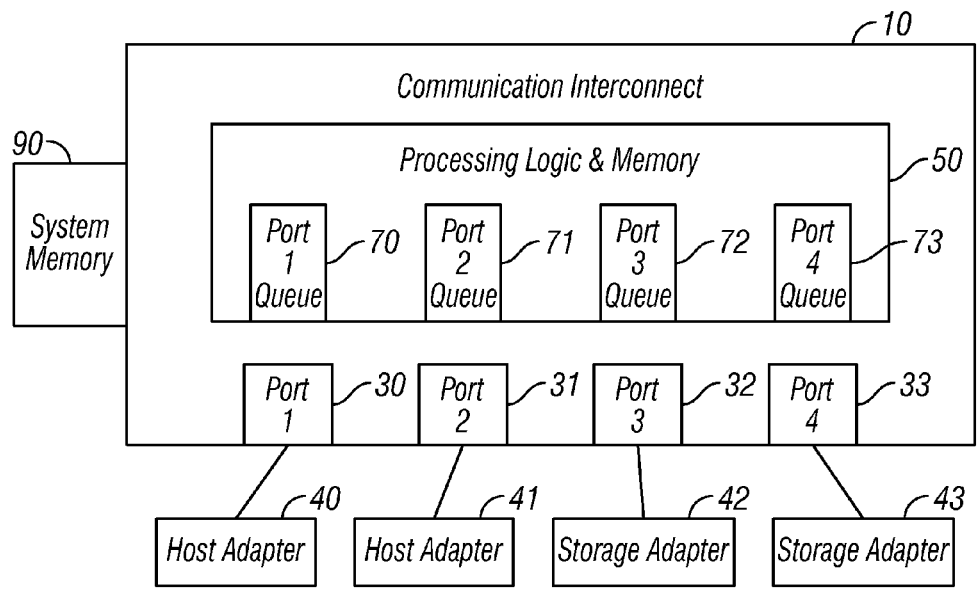
FIG. 1 is a block diagram of an exemplary communication interconnect which may implement aspects of the present invention.
Figure 2:
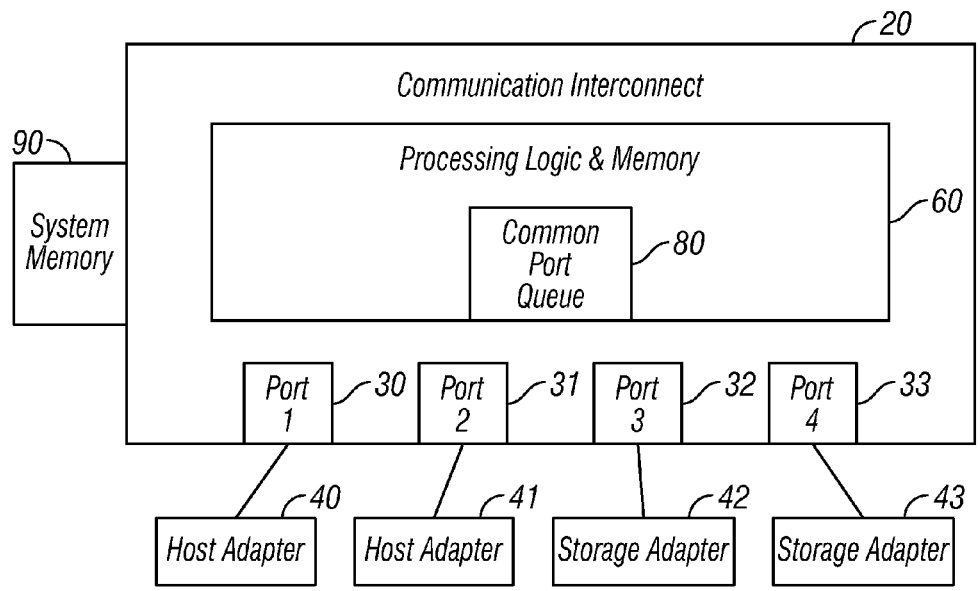
FIG. 2 is a block diagram of an alternative embodiment of an exemplary communication interconnect which may implement aspects of the present invention.

Referring to FIGS. 1 and 2, examples 10 and 20 of communication interconnects are illustrated. The communication interconnects are two of many communication interconnects which may implement the present invention, and a popular type of communication interconnect, such as employed in computer systems, is the peripheral component interconnect (PCI), discussed above. A successor comprises the PCI Express (PCIe) which provides higher performance while maintaining compatibility with existing PCI arrangements. PCI Express protocol is more complex, with three layers—the transaction, data link and physical layers serving as a switch function.

In each of the examples, four ports 30, 31, 32, 33 are illustrated, each connected to an adapter 40, 41, 42, 43. In practice, the number of ports and corresponding adapters may be substantially greater than that depicted. The operation of the communication interconnect is conducted by processing logic and memory 50, 60.

As discussed above, the PCIe switch needs to follow certain ordering rules set by specifications. As a result, the PCIe favors post transmissions over non-post transmissions in that all read or other non-post transmission requests or completions, with some exceptions, wait for the write or post transmission requests to be completed and flushed out. In one example, the processing logic and memory 50, 60 can handle a certain number of packet transmission requests at one time, and the rest of the incoming packets have to be left in the port incoming queues or common incoming queues, waiting to be dispatched. There is a limit to each queue, which is called "credits". Once all the credits are being used, further requests are blocked from getting into the queues. In the embodiment of FIG. 1, the credits of queues are separated by port, with each port having its own credits 70, 71, 72, 73, and in the embodiment of FIG. 2, a common set of credits of a common queue 80 are employed. Alternative embodiments may group certain of the ports. The communication interconnect may for example comprise a system memory 90 for storing transmissions and data.

As the result of the specifications for PCI Express, all post transmission requests or completions (without an override bit) wait for the non-post transmission(s) in the same direction to flush out. For example, assuming that adapter 40 and adapter 41 are conducting DMA (Direct Memory Access) write (a post transaction) to system memory 90 through the communication interconnect via ports 30 and 31. Meanwhile, adapter 42 and adapter 43 are reading the data from system memory 90 and sending the data to storage to be written into storage with the requirement of a completion (both non-post transactions). When adapters 40 and 41 are DMA writing to memory 90 to the limit of the port or processing logic bandwidth or throughput limits, these write requests will eventually consume the credits and be queued. Based on the above specifications and the preference for post requests, when there is a write request which can not be flushed out, the DMA read request coming from adapter 42 or adapter 43 can not be conducted and is delayed.

The present invention is applicable to each of the embodiments and shortens the delay for non-post transmissions while maintaining fairness among the post transmissions.

Figure 3:
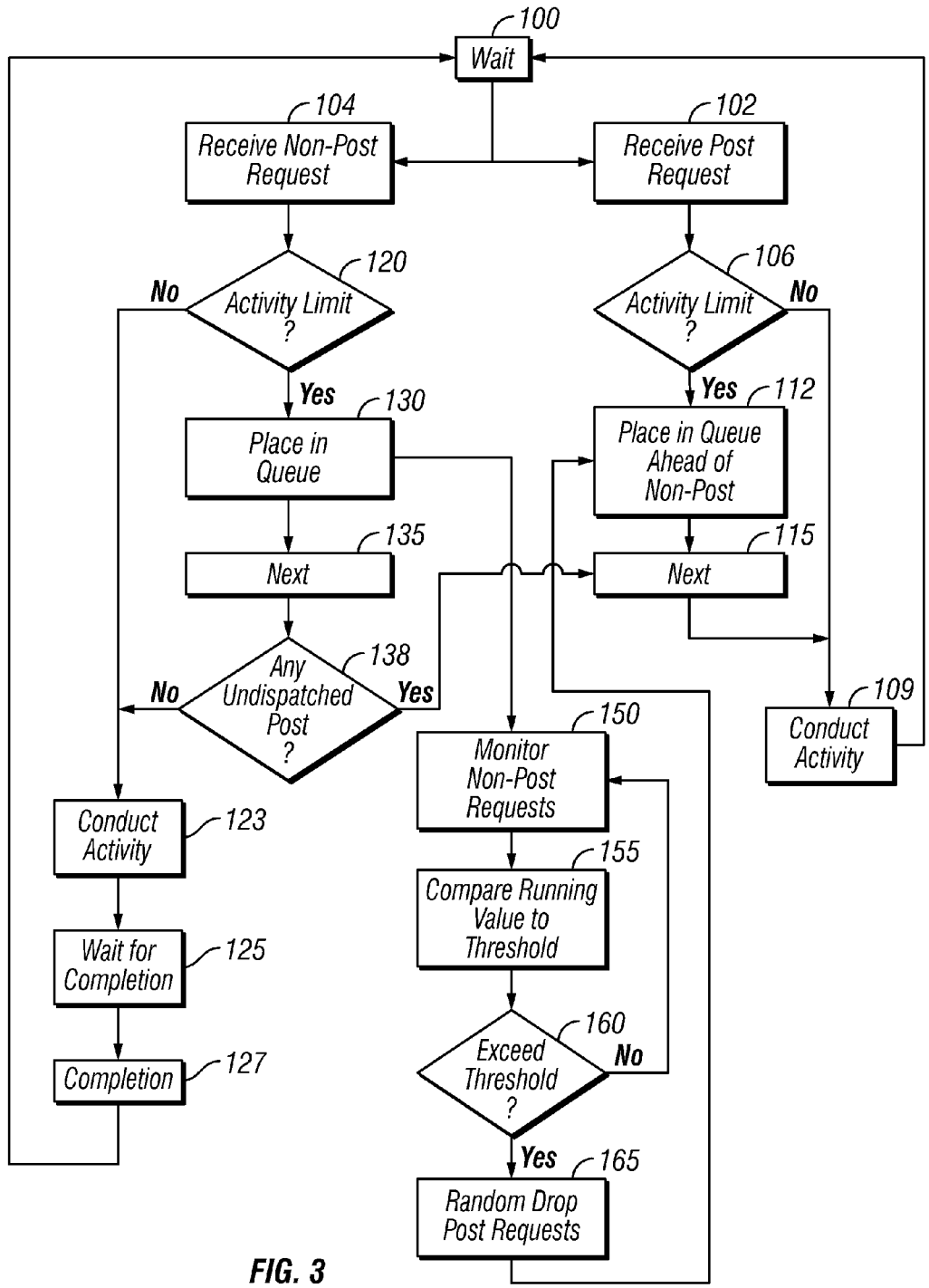
FIG. 3 is a flow chart depicting an exemplary method of operating the communication interconnects of FIGS. 1 and 2.

Referring additionally to FIG. 3, from step 100, incoming requests are parsed between post and non-post requests, post requests (such as writes) are received at step 102, and non-post requests (such as reads and completions) are received at step 104.

For post requests, step 106 determines whether the activity limit of the port(s) or processing logic has been reached ("YES") or whether the requested transmission can be conducted through an appropriate port ("NO"). If step 106 indicates that the activity can be conducted by the communication interconnect, step 109 conducts the activity through the appropriate port 30, 31, 32, 33. The process continues at step 100.

If step 106 determines that the activity limit has been reached, the post transmission request is queued in step 112 ahead of any non-post requests as required by the specifications. In one embodiment, the post request is queued in the queue 70, 71, 72, 73 related to a particular port of FIG. 1, and in another embodiment the post request is queued in a common queue 80 of FIG. 2. When the next activity is conducted and cleared from the communication interconnect, "next" in step 115, the queue is consulted and the next available queued post transmission request is dispatched to step 109 to conduct the activity.

Referring to step 104, a received non-post request is submitted to step 120 to determine whether the activity limit has been reached ("YES") or whether the requested transmission can be conducted through an appropriate port ("NO"). If step 106 indicates that the activity can be conducted by the communication interconnect, step 123 conducts the activity through the appropriate port 30, 31, 32, 33. Most non-post transmissions require a completion response as depicted in steps 125 and 127. Once the completion has been received, the process continues at step 100.

If step 120 determines that the activity limit has been reached, the non-post transmission request is queued in step 130 behind any post requests as required by the specifications in queue 70, 71, 72, 73 or queue 80. The queue or queues may be set up to queue activity of a single direction, and a separate queue or queues set up to queue activity in the opposite direction. When the next activity is conducted and cleared from the communication interconnect, "next" in step 135, step 138 determines whether there is any undispatched post transmission request. If not ("NO"), the queue is consulted and the next available non-post activity is dispatched to step 123 to conduct the activity. Most non-post transmissions require a completion response as depicted in steps 125 and 127. Once the completion has been received, the process continues at step 100.

If step 138 instead determines that there is an undispatched post request ("YES"), the process leads to step 115 and the next available queued post activity is dispatched to step 109 to conduct the activity, again in accordance with the specifications.

The flow chart of FIG. 3 and the above discussion does not include a description of the instances where certain non-post transmission requests are given a priority with respect to post transmission requests, which is allowed within the specification.

The above action in accordance with the specifications favoring post transmission requests over non-post transmission requests where, with some exceptions, the non-post transmission requests wait for the write or post transmissions to be completed and flushed out, results in delays to non-post transmission requests such as read requests.

Still referring to FIGS. 1, 2 and 3, in step 150, the non-post requests are monitored from the queues 70, 71, 72 and 73 of FIG. 1 or queue 80 of FIG. 2. The monitoring is to shorten the delay for non-post transmissions while maintaining fairness among the post transmissions. Specifically, the undispatched non-post transmission requests are monitored on a running basis. The monitoring may comprise monitoring of transmission requests in one direction, and a separate monitoring may be of transmission requests in the opposite direction.

Step 155 compares the running value obtained in step 150 to a threshold, and step 160 determines whether the threshold has been exceeded. The running value may be a total number of undispatched non-post transmission requests in all of the queues 70, 71, 72 and 73 of FIG. 1 or queue 80 of FIG. 2, or may be a ratio of non-post transmission requests to the post transmission requests and the threshold of steps 155 and 160 is set accordingly. Alternatively, the running value may be a total number of undispatched non-post transmission requests viewed separately for each of the queues 70, 71, 72 and 73 of FIG. 1, and the threshold of steps 155 and 160 is set so that it is exceeded if any one of the queues exceeds the threshold.

An example of a threshold is, if the ratio of undispatched non-post transmission requests is 65% of the total number of undispatched transmission requests, as compared to undispatched post transmission requests being 35% of the total, comprising a ratio of 65/35. The threshold may be set based on requests of one direction only.

If step 160 determines that the threshold has not been exceeded ("NO"), the monitoring continues in step 150.

If step 160 determines that the threshold has been exceeded ("YES"), step 165 randomly drops ones of the post transmission requests from the queues.

One example of randomly dropping post transmission requests is to assign each of the post transmission requests (for all queues 70, 71, 72 and 73 of FIG. 1 or queue 80 of FIG. 2 and incoming post transmission requests) a random number between "0" and "1", and setting a value "V" and dropping all post transmission requests having an assigned random number on one side of the set value, and processing those having an assigned random number on the other side of the set value.

The value thus determines the proportion of the post transmission requests that are dropped. In one example, the value "V" is set at "0.5" so that the odds are that one half of the post transmission requests are dropped.

The drop may take the form of deleting the dropped post transmission request, with the result that the lower layer in the protocol stack of the requesting entity of the transmission request eventually realizes that the request was not fulfilled. In PCIe, the "drop" described above is executed by the higher TLP (Transaction Layer Packet) layer, and the DLLP (Data Link Layer Packet) layer in the sending node would detect the drop. Another form may comprise deleting the dropped post transmission request and sending a "no acknowledgement" or "NAK" packet in the DLLP layer to the requesting entity to indicate that the request failed.

In one embodiment, the post transmission requests are dropped based on one of the ports 30, 31, 32 or 33, and in another embodiment, the post transmission requests are dropped based on the plurality of ports 30, 31, 32 and 33.

By employing a random drop process, the odds are that the drops are evenly spread throughout the post transmission requests, providing fairness among the post transmission requests in that no one set or sequence of post transmission requests is likely to become the only one affected. Further, when the random drops are for a plurality of ports, fairness is maintained amongst the ports as well since the more post requests a port sends to the interconnect, the more drops it will get.

Figure 4:
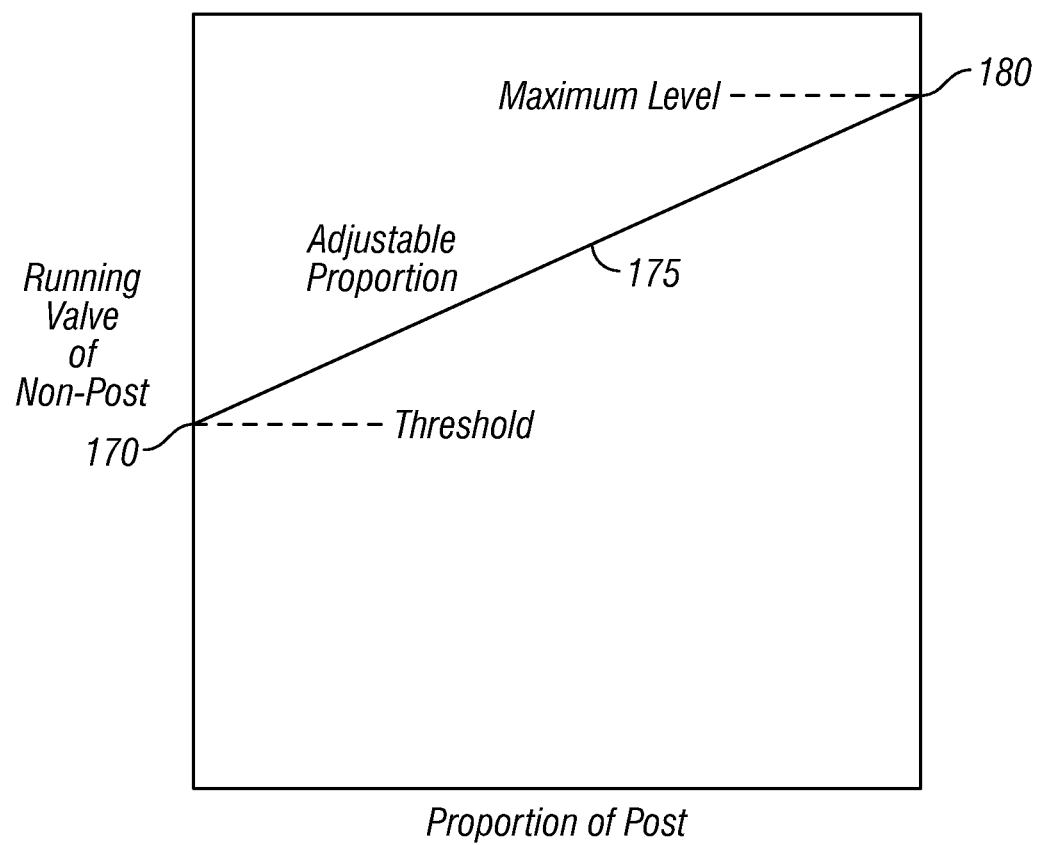
FIG. 4 is a diagrammatic illustration of the random drop of post requests of the method of FIG. 3.

Referring additionally to FIG. 4, the random drops may be adjustable. For example, if the initial random drop is set at "V" equals "0.5" when the threshold is met (as shown by point 170), and if the running value of non-post transmission requests becomes greater than the threshold, the value of "V" is adjusted to increase the proportion of the non-post transmission requests that are dropped, as shown by line 175. The line 175 represents a series of points of values of "V" wherein post transmission requests having assigned random numbers on one side of the adjustable point are dropped, and request having assigned random numbers on the other side of the adjustable point are processed. At some point, the running value of non-post transmission requests may reach a maximum level 180 (for example a ratio of 95/5 non-post transmission requests, means that the undispatched non-post transmission requests are 95% of the total number of undispatched transmission requests, as compared to undispatched post transmission requests being 5% of the total. At the maximum level, all of the post transmission requests are dropped. In one example, "V" may be set to the extreme of "1.0" (or "0.0") so that all of the randomly generated numbers are included and all of the post transmission requests are dropped.

The result of the above is that the delay for non-post transmission requests is reduced and the reduction is done in such a way that there is fairness among the post transmission requests and among the ports.

A person of ordinary skill in the art will appreciate that the embodiments of the present invention, disclosed herein, including the processing logic and memory 50, 60 for operating the communication interconnect 10, 20 of FIG. 1 or of FIG. 2, and the functionality provided therein, may be embodied as a chipset, system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit", "chipset", "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for dynamically adjusting packet transmissions comprising post transmissions and non-post transmissions in a communication interconnect, wherein said communication interconnect favors said post transmissions over said non-post transmissions, comprising:
   placing low priority non-post transmission requests in at least one queue behind any post transmission requests;
   placing post transmission requests in said at least one queue ahead of said low priority non-post transmission requests;
   during transmission of said favored post transmissions, monitoring undispatched non-post transmission requests of said at least one queue on a running basis;
   determining when a running value of said undispatched non-post transmission requests exceeds a threshold; and
   in response to said threshold being exceeded, randomly dropping ones of only said favored post transmission requests from said at least one queue to reduce delay for said non-post transmissions.

2. The method of claim 1, comprising monitoring said undispatched non-post transmission requests separately for each port of a plurality of ports of said communication interconnect; wherein said threshold comprises a threshold for each said port; and randomly dropping ones of said post transmission requests for a port in response to said threshold for said port being exceeded.

3. The method of claim 1, comprising monitoring said non-post transmission requests for a plurality of ports of said communication interconnect; wherein said threshold comprises a threshold combining said monitored requests for said plurality of ports; and randomly dropping ones of said post transmission requests for said plurality of ports.

4. The method of claim 1, wherein said random drop comprises an adjustable proportion of said post transmission requests that are randomly dropped.

5. The method of claim 4, wherein said random drop comprises a maximum level in which all said post transmission requests are dropped.

6. The method of claim 4, wherein said random drop adjustable proportion comprises a linear slope.

7. The method of claim 4, wherein said random drop comprises an adjustable point within a range of random numbers assigned to said post transmission requests, said requests having assigned random numbers on one side of said adjustable point being dropped and said requests having assigned random numbers on the other side of said adjustable point being processed.

8. In a communication interconnect comprising a plurality of ports and processing components arranged to conduct packet transmissions comprising post transmissions and non-post transmissions, wherein said communication interconnect favors said post transmissions over said non-post transmissions, said processing components additionally arranged to:
   place low priority non-post transmission requests in at least one queue behind any post transmission requests:
   place post transmission requests in said at least one queue ahead of said low priority non-post transmission requests:
   during transmission of said favored post transmission, monitor undispatched non-post transmission requests of said at least one queue on a running basis;
   determine when a running value of said undispatched non-post transmission requests exceeds a threshold; and
   in response to said threshold being exceeded, randomly drop ones of only said favored post transmission requests from said at least one queue to reduce delay for said non-post transmissions.

9. The communication interconnect processing components of claim 8, additionally arranged to monitor said undispatched non-post transmission requests separately for each port of a plurality of said ports of said communication interconnect; wherein said threshold comprises a threshold for each said port; and randomly drop ones of said post transmission requests for a port in response to said threshold for said port being exceeded.

10. The communication interconnect processing components of claim 8, additionally arranged to monitor said non-post transmission requests for a plurality of ports of said communication interconnect; wherein said threshold comprises a threshold combining said monitored requests for said plurality of ports; and randomly drop ones of said post transmission requests for said plurality of ports.

11. The communication interconnect processing components of claim 8, wherein said random drop comprises an adjustable proportion of said post transmission requests that are randomly dropped.

12. The communication interconnect processing components of claim 11, wherein said random drop comprises a maximum level in which all said post transmission requests are dropped.

13. The communication interconnect processing components of claim 11, wherein said random drop adjustable proportion comprises a linear slope.

14. The communication interconnect processing components of claim 11, wherein said random drop comprises an adjustable point within a range of random numbers assigned to said post transmission requests, said requests having assigned random numbers on one side of said adjustable point being dropped and said requests having assigned random numbers on the other side of said adjustable point being processed.

15. A communication interconnect comprising:
   a plurality of ports; and
   processing components arranged conduct packet transmissions comprising post transmissions and non-post transmissions, wherein said communication interconnect favors said post transmissions over said non-post transmissions; place low priority non-post transmission requests in at least one queue behind any post transmission requests; place post transmission requests in said at least one queue ahead of said low priority non-post transmission requests: during transmission of said favored post transmissions, monitor undispatched non-post transmission requests of said at least one queue on a running basis; determine when a running value of said undispatched non-post transmission requests exceeds a threshold; and, in response to said threshold being exceeded, randomly drop ones of only said favored post transmission requests from said at least one queue to reduce delay for said non-post transmissions.

16. The communication interconnect of claim 15, additionally arranged to monitor said undispatched non-post transmission requests separately for each port of a plurality of said ports of said communication interconnect; wherein said threshold comprises a threshold for each said port; and randomly drop ones of said post transmission requests for a port in response to said threshold for said port being exceeded.

17. The communication interconnect of claim 15, additionally arranged to monitor said non-post transmission requests for a plurality of ports of said communication interconnect; wherein said threshold comprises a threshold combining said monitored requests for said plurality of ports; and randomly drop ones of said post transmission requests for said plurality of ports.

18. The communication interconnect of claim 15, wherein said random drop comprises an adjustable proportion of said post transmission requests that are randomly dropped.

19. The communication interconnect of claim 18, wherein said random drop comprises a maximum level in which all said post transmission requests are dropped.

20. The communication interconnect of claim 18, wherein said random drop comprises an adjustable point within a range of random numbers assigned to said post transmission requests, said requests having assigned random numbers on one side of said adjustable point being dropped and said requests having assigned random numbers on the other side of said adjustable point being processed.

* * * * *